United States Patent [19]
Sato et al.

[11] Patent Number: 5,999,920
[45] Date of Patent: Dec. 7, 1999

[54] SYSTEM FOR ASSISTING IN MANAGEMENT OF PACKAGING PLANT

[75] Inventors: Kenichi Sato, Ikoma; Osamu Yamazaki, Toyonaka; Koichi Kanematsu, Hirakata; Yasuhiro Okada, Moriguchi, all of Japan

[73] Assignee: Matsushita Electric Industrial Co., Ltd., Japan

[21] Appl. No.: 08/837,100

[22] Filed: Apr. 14, 1997

[30] Foreign Application Priority Data

Apr. 16, 1996 [JP] Japan ..................................... 8-093709

[51] Int. Cl.⁶ .................................................. G06F 17/60
[52] U.S. Cl. ............... 705/400; 364/468.05; 364/468.09; 705/11; 705/7; 705/8
[58] Field of Search ..................... 705/7, 8, 400, 705/9, 1, 11; 364/468.13, 468.14, 468.22, 468.05, 468.09

[56] References Cited

U.S. PATENT DOCUMENTS 5,258,915 11/1993 Billington et al. ...................... 364/468
5,499,188 3/1996 Kline, Jr. et al. ....................... 364/468
5,564,183 10/1996 Satou et al. ............................... 29/840

*Primary Examiner*—James P. Trammell
*Assistant Examiner*—Chinor M. Lee
*Attorney, Agent, or Firm*—Parkhurst Wendel, L.L.P

[57] ABSTRACT

A system for assisting in management of a packaging plant, according to which such information as on packaging cost, machine characteristics and surface packaging method is transformed into database, whereby the packaging cost calculation, production capacity calculation, line arrangement method, packaging method, and packaging arrangement investigation method are translated into numeral equations or software. With this system, highly accurate investigation results can be output in a short time period, thereby assisting in making an optimum management decision.

10 Claims, 13 Drawing Sheets

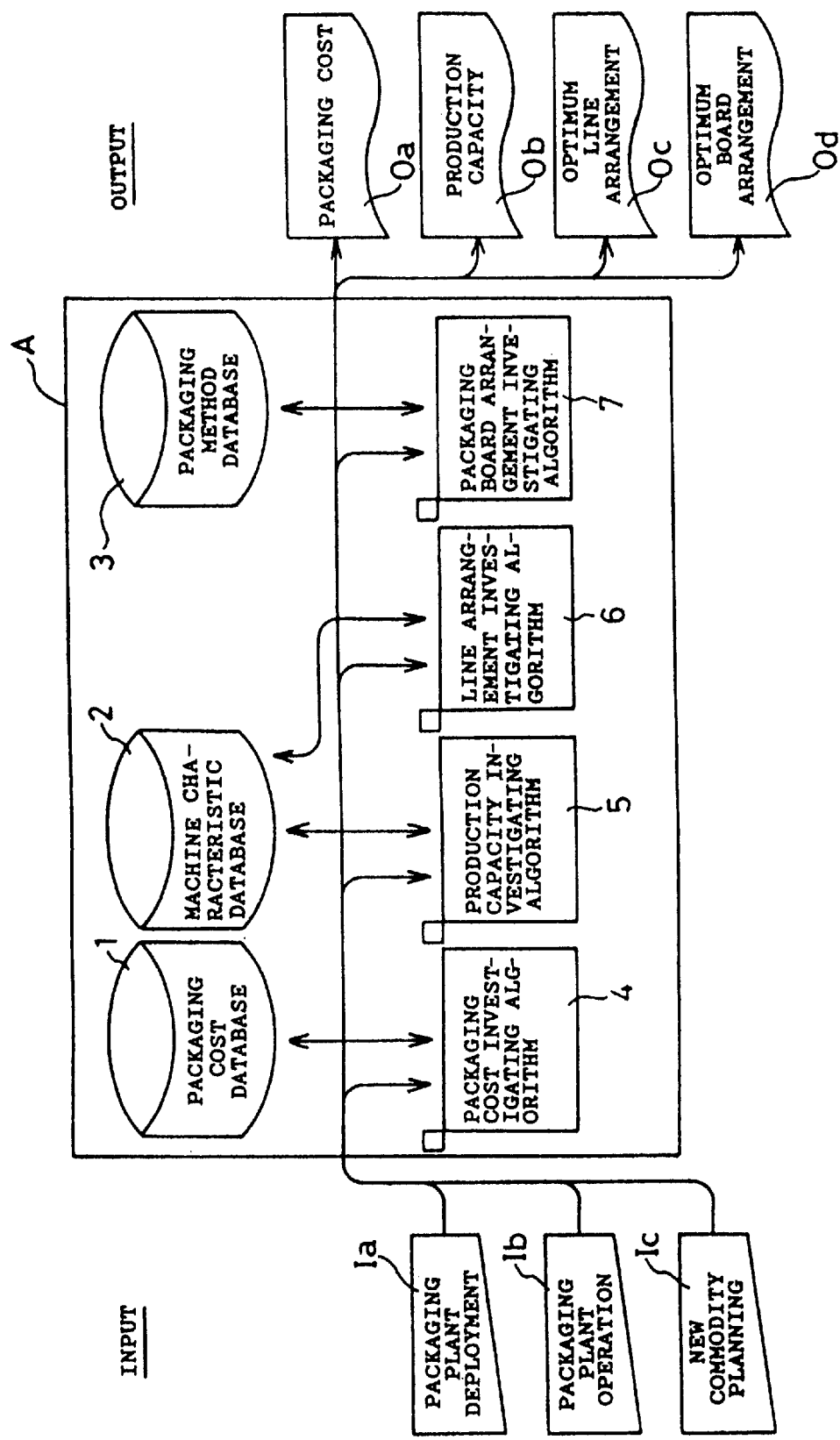

FIG. 2

PARTS COST DB — 1a

| | SMT | DISCRETE |
|---|---|---|
| RESISTOR | 1608 ¥1 | 1/4W ¥0.8 |
| TRANSISTOR | MINI Tr ¥8 | Tr ¥6 |
| ELECTROLYTIC CAPACITOR | 6φ ¥20 | 6φ ¥5 |
| IC | SOP14P ¥30 | DIP14P ¥25 |
| : | : | : |

INSTALLATION COST DB — 1b

| | TIME RATE | MAINTENANCE/SPARE PARTS COST | REJECTION RATE |
|---|---|---|---|
| LINE 1 (INSERTION) | ¥60 | ¥30 | 12% |
| LINE 2 (MOUNTING) | ¥80 | ¥10 | 3% |
| : | : | : | : |

PERSONNEL EXPENDITURE DB — 1c

| | JAPANESE RATE | CHINESE RATE |
|---|---|---|
| PERSONNEL EXPENDITURE (/H) | ¥3,000 | ¥150(GEN) |
| ENERGY COST (/H) | ¥1,000 | ¥50(GEN) |
| : | : | : |

EXCHANGE RATE DB — 1d

| | CASE 1 | CASE 2 | CASE 3 |
|---|---|---|---|
| 1 DOLLAR | ¥80 | ¥70 | ¥60 |
| 1 GEN (CHINA) | ¥10 | ¥9 | ¥8 |
| 1 MALAYSIAN DOLLAR (MALAYSIA) | ¥34 | ¥32 | ¥30 |

FIG. 3

- OVERALL PARTS COST = Σ UNIT COST OF PARTS × NUMBER OF PARTS
  (INSERTION)                    (INSERTION)
- OVERALL PARTS COST = Σ UNIT COST OF PARTS × NUMBER OF PARTS
  (MOUNTING)                     (MOUNTING)
- OVERALL INSTALLATION COST = TIME RATE × PACKAGING TIME +
  (INSERTION)                  (INSERTION)
  MAINTENANCE/SPARE PARTS COST + COST FOR REPAIRING OF REJECTS
  (INSERTING)                                (INSERTION)
- OVERALL INSTALLATION COST = TIME RATE × PACKAGING TIME +
  (MOUNTING)                   (MOUNTING)
  MAINTENANCE/SPARE PARTS COST + COST FOR REPAIRING OF REJECTS
  (MOUNTING)
- OVERALL PERSONNEL EXPENDITURE = TIME RATE × PACKAGING TIME
  (JAPAN)                          (JAPAN)
- OVERALL PERSONNEL EXPENDITURE = TIME RATE × PACKAGING TIME
  (CHINA)                          (CHINA)
- OVERALL PACKAGING COST = OVERALL PARTS COST +
  OVERALL INSTALLATION COST + OVERALL PERSONNEL EXPENDITURE

FIG. 4

| PARTS \ MACHINE | MACHINE TYPE A | MACHINE TYPE B | MACHINE TYPE C | MACHINE TYPE D | MACHINE TYPE E | MACHINE TYPE F |
|---|---|---|---|---|---|---|
| QUADRANGULAR CHIP | 0.094 SEC. | 0.14 | 0.2 | 0.48 | 0.48 | 0.6 |
| TRANSISTOR | 0.12 | 0.14 | 0.2 | 0.48 | 0.48 | 0.6 |
| SOP | 0.2 | 0.2 | 0.4 | 0.8 | 0.8 | 1.2 |
| QFP | 0.4 | 0.4 | IMPOSSIBLE | 1.0 | 2.0 | 3 |
| CYLINDRICAL CHIP | IMPOSSIBLE | 0.2 | IMPOSSIBLE | 0.48 | 0.48 | 0.6 |
| LONG CONNECTOR | IMPOSSIBLE | IMPOSSIBLE | IMPOSSIBLE | IMPOSSIBLE | IMPOSSIBLE | IMPOSSIBLE |
| MONEY INVESTED | 3000 | 3500 | 2000 | 3000 | 2500 | 1000 |

FIG.6

○ OVERALL PACKAGING CYCLE = Σ PACKAGING CYCLE × NUMBER OF PARTS + LOADING TIME +
  (MODEL 2 LINE)

Σ PACKAGING CYCLE × NUMBER OF PARTS + LOADING TIME
  (MACHINE TYPE D)                                    (MACHINE TYPE A)

○ PRODUCTION CAPACITY = $\frac{\text{8 HOURS} \times \text{2 SHIFTS} \times \text{20 DAYS}}{\text{OVERALL PACKAGING TIME}}$ ○ OVERALL PACKAGING CYCLE = Σ PACKAGING CYCLE × NUMBER OF PARTS + LOADING TIME +
  (MODEL 1 LINE)                                    (MACHINE TYPE B)

Σ PACKAGING CYCLE × NUMBER OF PARTS + LOADING TIME
  (MACHINE TYPE E)

○ OVERALL PACKAGING CYCLE = Σ PACKAGING CYCLE × NUMBER OF PARTS + LOADING TIME +
  (EXISTING LINE)                                   (MACHINE TYPE C)

Σ PACKAGING CYCLE × NUMBER OF PARTS + LOADING TIME
  (MACHINE TYPE F)

FIG. 7
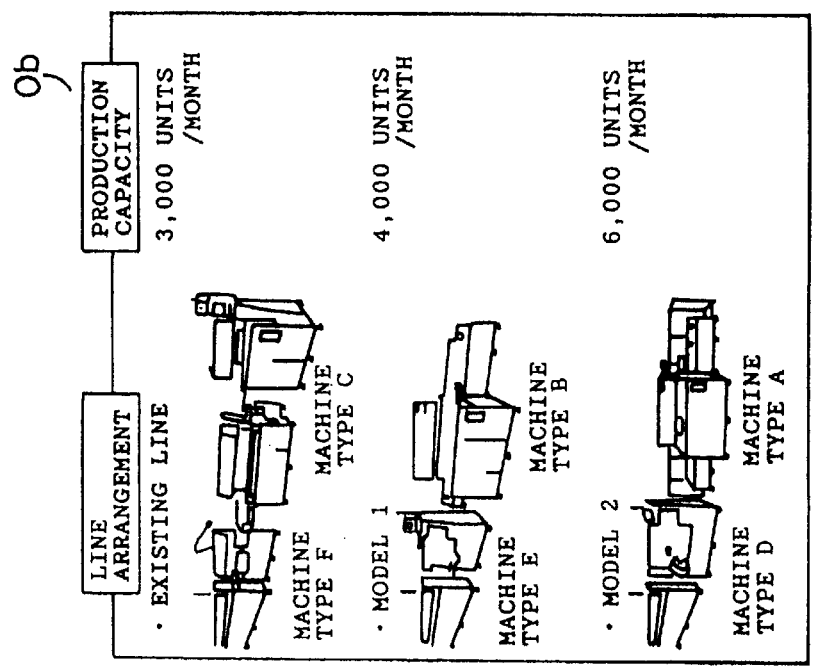
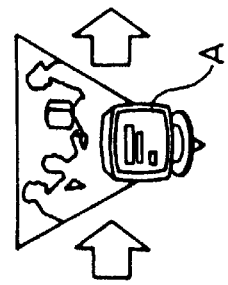
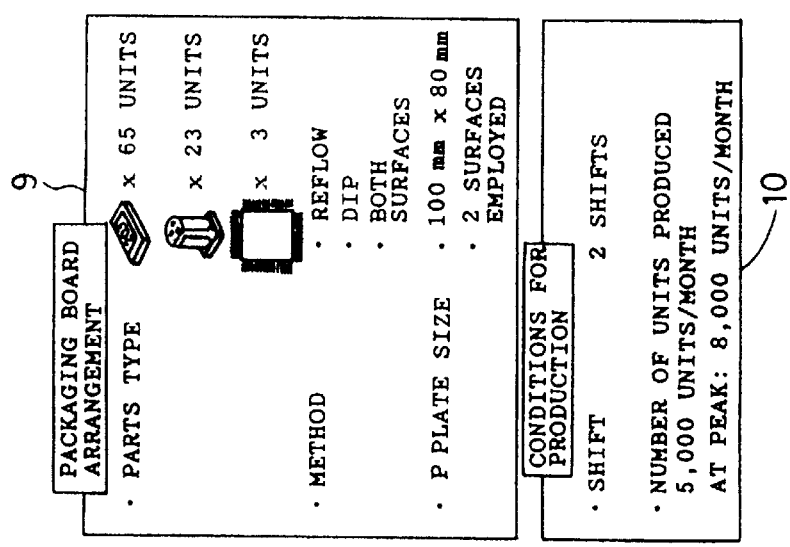

SYSTEM FOR ASSISTING IN MANAGEMENT OF PACKAGING PLANT

TECHNICAL FIELD

The present invention relates to a system for assisting in the management of a packaging plant to investigate the arrangement of the production line of the plant where parts are packaged on circuit boards.

BACKGROUND OF THE INVENTION

A conventional example of a procedure for making a management decision in such packaging plant will now be described with reference to FIG. 13.

One of the major elements in making a management decision in a packaging plant is the packaging cost. A trial calculation of this packaging cost is made, as shown in FIG. 13, by multiplying the uniformly rated standard packaging cost, which covers a series ranging from standard quadrangular chips easy to package to QFD and connectors of peculiar shape difficult to package, by the number of parts to be packaged.

An investigation of the capacity for production of packaging boards in a certain packaging line is made by dividing the product of the standard packaging cycle and the total number of parts to be packaged, by the machine standard packaging capacity. This standard packaging cycle is set uniformly for all dissimilar types of parts to be packaged. The machine standard packaging capacity uniformly specifies the packaging capacity, which naturally may vary according to parts to be packaged and machine productivity with respect to the degree of difficulty in packaging.

An investigation of a line arrangement is made solely by a rule of thumb worked out by the managerial class employees working at a job site in a plant, on the basis of production information about the arrangement and number of parts and necessary production capacity concerning boards to be produced and machine characteristic information about the machine parts-associated capacity and the machine standard packaging capacity.

An investigation of the arrangement of packaging boards is made pursuant to the conventional method. Specifically, if conventional products adopt the insertion method, this method is employed as such, and if they adopt the surface packaging method, this method is employed as such. Thus, under the present situation, the determination of a packaging method employed has not been based on general assessment of all elements involved in production, such as the parts cost, packaging cost, control cost, and quality.

Therefore, the arrangement in said conventional example has been confronted with a problem that the accuracy of calculation is poor in that all parts are calculated on the basis of the same standard packaging cost.

Further, since all parts are calculated using the same standard packaging cycle, there is a problem that the accuracy of calculation is poor.

Further, since the line arrangement is investigated by the instinct and experience of managerial class employees working at a job site, there is a problem that the resulting line arrangement is not necessarily optimum.

Further, since all elements involved in production are not subjected to general assessment, there is a problem that the selected method is not necessarily optimum, nor are the produced boards.

DISCLOSURE OF THE INVENTION

An object of the invention is to provide a system for assisting in the management of a packaging plant, which solves the above problems and enables an investigation to be made to provide an accurate total packaging cost, an accurate production capacity, an optimum line arrangement by selection of an optimum machine, and an optimum packaging board.

To achieve this object, a system for assisting in the management of a packaging plant according to the present invention comprises;

- a packaging cost database having stored therein packaging cost data for individual types of parts to be packaged on a board, and
- a packaging cost investigation algorithm for calculating the cost of packaging on said boards to be produced, on the basis of the arrangement and number of parts concerning boards to be produced and on the basis of packaging cost data derived from said packaging cost database.

According to this arrangement, an investigation to provide an accurate total packaging cost can be made by multiplying an appropriate packaging cost for each type of parts, by the total number of parts of that type.

Further, a system for assisting in the management of a packaging plant according to the present invention comprises;

- a machine characteristic database having stored therein machine characteristic information about the parts-associated capacity and standard packaging capacity of each available packaging machine, and
- a production capacity investigating algorithm for investigating the production capacity by multiplying the packaging cycle for each type of parts by the number of parts to be packaged and dividing the resulting product by the appropriate machine packaging capacity taking into consideration the machine characteristics derived from said machine characteristic database.

According to this arrangement, an investigation to provide a production capacity with high accuracy can be made by multiplying the appropriate packaging cost for each type of parts by the number of parts to be packaged and dividing the resulting product by the appropriate machine packaging capacity with the characteristics of the machine taken into account.

Further, a system for assisting in the management of a packaging plant according to the present invention comprises;

- a machine characteristic database having stored therein machine characteristic information about the parts-associated capacity and standard packaging capacity of each installed packaging machine, and
- a line arrangement investigating algorithm for making an investigation to provide an optimum line arrangement by selecting an optimum machine on the basis of production information about the arrangement and number of parts and the required capacity of production concerning boards to be produced and machine characteristic information derived from said machine characteristic database.

According to this arrangement, an investigation to provide an optimum line arrangement can be made by selecting an optimum machine on the basis of production information about the arrangement and number of parts and the required capacity of production concerning boards to be produced and machine information about the machine parts-associated capacity and the machine standard packaging capacity.

Further, a system for assisting in the management of a packaging plant according to the present invention comprises;

a packaging method database having stored therein assessment values concerning items to be investigated, such as the parts cost, packaging cost, control cost and quality during the production with respect to each of a plurality of packaging methods, and a packaging board arrangement investigating algorithm for making an investigation to provide a method which satisfies a required commodity specification and which results in the calculated assessment value being maximum, by calculating an overall assessment value involved in the production of the commodity of required specification for each packaging method, on the basis of said packaging method database.

According to this arrangement, an investigation can be made to provide an optimum packaging board after all elements involved in production have been assessed.

Further, a system for assisting in the management of a packaging plant according to the present invention comprises a plurality of combinations, including a combination of said packaging cost database and said packaging cost investigating algorithm, a combination of said machine characteristic database and said production capacity investigating algorithm, a combination of said machine characteristic database and said line arrangement investigating algorithm, and a combination of said packaging method database and said packaging board arrangement investigating algorithm.

Thus, according to the present invention, investigations can be assisted to provide an overall packaging cost of high accuracy, a production capacity of high accuracy, an optimum line arrangement obtained by selecting an optimum machine, and an optimum packaging board arrangement.

Therefore, according to the invention, data on the packaging cost, production capacity, optimum line arrangement and optimum board arrangement can be outputted with high accuracy in a short time with respect to subjects, such as the deployment and operation of the packaging plant, and the planning of new commodities; therefore, a management decision as to optimum plant deployment, optimum plant operation, and the planning of optimum new commodities can be realized, thus bringing about a merit that the management loss is minimized.

BRIEF DESCRIPTION OF THE DRAWINGS

FIG. 1 is a block diagram showing the arrangement of a system for assisting in the management of a packaging plant according to an embodiment of the present invention;

FIG. 2 is a view showing an example of a packaging cost database in FIG. 1;

FIG. 3 is a view showing in detail a packaging cost investigating algorithm in FIG. 1;

FIG. 4 is a view showing an example of a machine characteristic database in FIG. 1;

FIG. 6 is a view showing in detail a production capacity investigating algorithm in FIG. 1;

FIG. 7 is a conceptual presentation of a line arrangement and production capacity investigating algorithm in FIG. 1;

DESCRIPTION OF EMBODIMENTS

Figure 5:
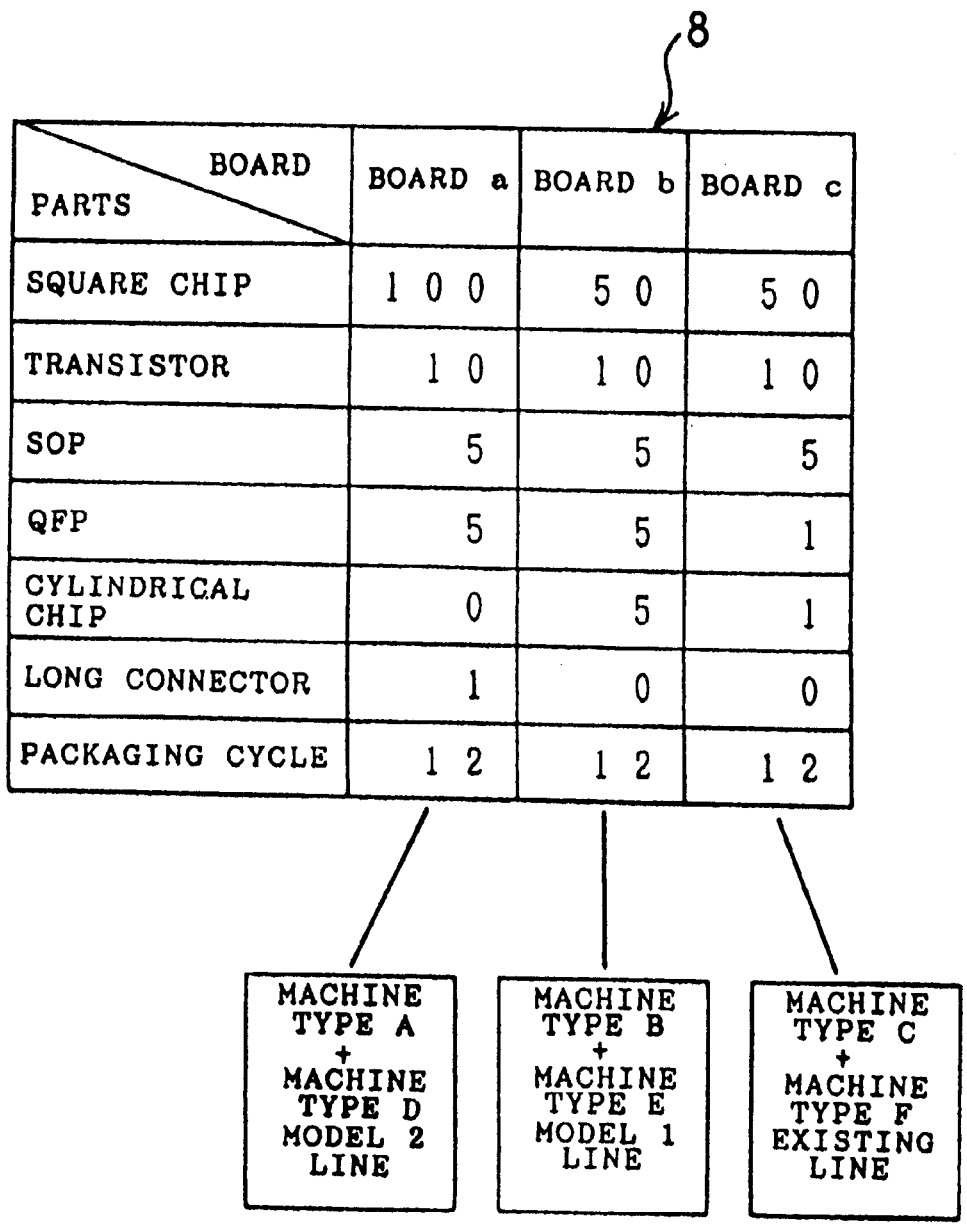
FIG. 5 is a view showing by way of example a board parts arrangement table.

FIG. 1 shows the arrangement of a system for assisting in the management of a packaging plant according to an embodiment of the present invention. This packaging plant management assisting system shown in FIG. 1 is composed of a computer A, which comprises a packaging cost database 1, a machine characteristic database 2, a packaging method database 3, a packaging cost investigating algorithm 4, a production capacity investigating algorithm 5, a line arrangement investigating algorithm 6, and a packaging board arrangement investigating algorithm 7.

The computer A is fed with packaging plant deployment information Ia, packaging plant operating information Ib, and new commodity planning information Ic. When fed with these information items Ia–Ic, the computer A delivers, on the basis of these information items, Ia–Ic, data on a packaging cost Oa, a production capacity Ob, an optimum line arrangement Oc, and an optimum board arrangement Od, which enable production to be economically effected in the case where one's own packaging facilities are used.

Particularly, there are problems of how to deploy the packaging plant with respect to a future production plan and what place which is optimum for production is to be selected to cope with variations in the foreign exchange rate and personnel expenditures.

Another problem is how to examine and improve the packaging plant at all times so as to ensure optimum operation from the standpoints of productivity, quality, lead time, and inventory.

Another problem is that in planning a new commodity, it is necessary to make a trial calculation of costs, and a decision on a packaging method and board arrangement, and secure a necessary production capacity for the scheduling of the new commodity.

The packaging cost database 1 has stored therein packaging cost data for individual types of parts exemplified in FIG. 2. Particularly, it is composed of a parts cost database 1a having stored therein data on the costs of individual parts, an installation cost database 1b having stored therein data on the time rate cost, maintenance and spare parts costs and rejection rates for individual packaging machines, a personnel expenditure database 1c having stored therein such items as personnel expenditures and energy costs according to different countries, and a foreign exchange rate database 1d.

The packaging cost investigating algorithm 4 calculates the packaging cost of boards to be produced, on the basis of the arrangement and number of parts concerning boards to be produced and packaging cost data derived from the packaging cost database 1. Particularly, as shown in FIG. 3, a comparison is made between the insertion packaging method and the mount packaging method as to the parts cost and installation cost, followed by a comparison between domestic production and overseas production as to personnel expenditures and overall packaging cost.

The machine characteristic database 2 shown in FIG. 1 stores machine characteristic information about the parts-associated capacity and the standard packaging capacity of each installed packaging machine. Particularly, as shown in FIG. 4, the machine characteristic database 2 is stored with data on the cycle time required for the packaging of electronic parts for each packaging machine.

The production capacity investigating algorithm 5 shown in FIG. 1 investigates the production capacity by multiplying the packaging cycle for each type of parts by the number of parts to be packaged and dividing the resulting product by the appropriate machine packaging capacity taking into consideration the machine characteristics derived from the machine characteristic database 2. Particularly, the production capacity investigating algorithm 5, as exemplified in FIG. 6, investigates the production capacities of the existing line, the model 1 line and the model 2 line concerning boards in question.

Figure 8:
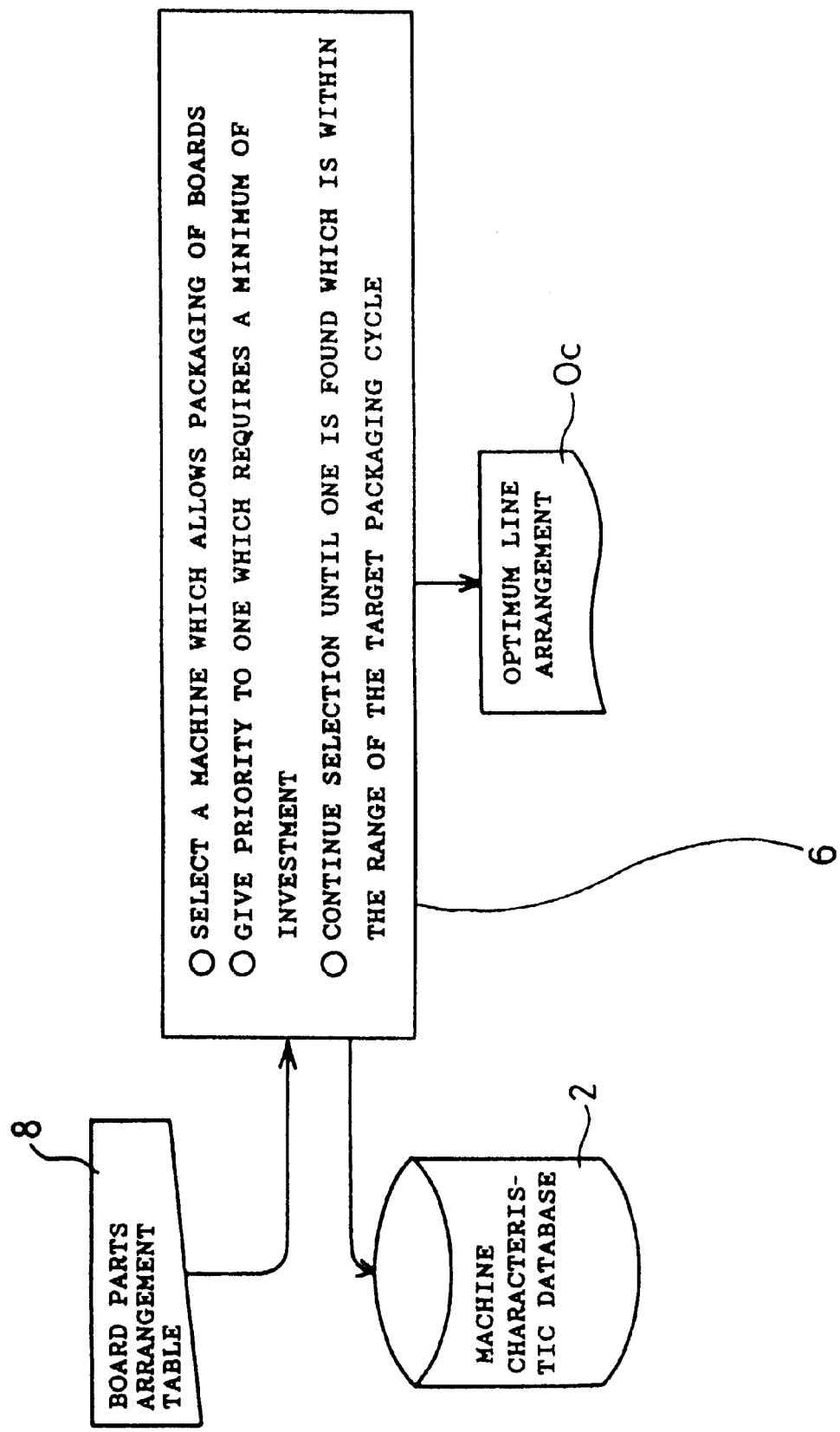
FIG. 8 is a view showing in detail a line arrangement investigating algorithm.

Packaging on an intended board can be effected by cooperation of the machine characteristic database 2 exemplified in FIG. 4, the board parts arrangement table 8 exemplified in FIG. 5 and the line arrangement investigating algorithm 6 shown in FIG. 8. At that time, an investigation can be made so as to provide an optimum arrangement Oc in which the packaging cycle and investment are minimum.

FIG. 7 shows the concept of the production capacity investigating algorithm 5 and the line arrangement investigating algorithm 6. The computer A is furnished with data on the packaging board arrangement 9 and production conditions 10. The computer A computes the production capacity Ob for each line arrangement through the aforesaid processing.

Figure 9:
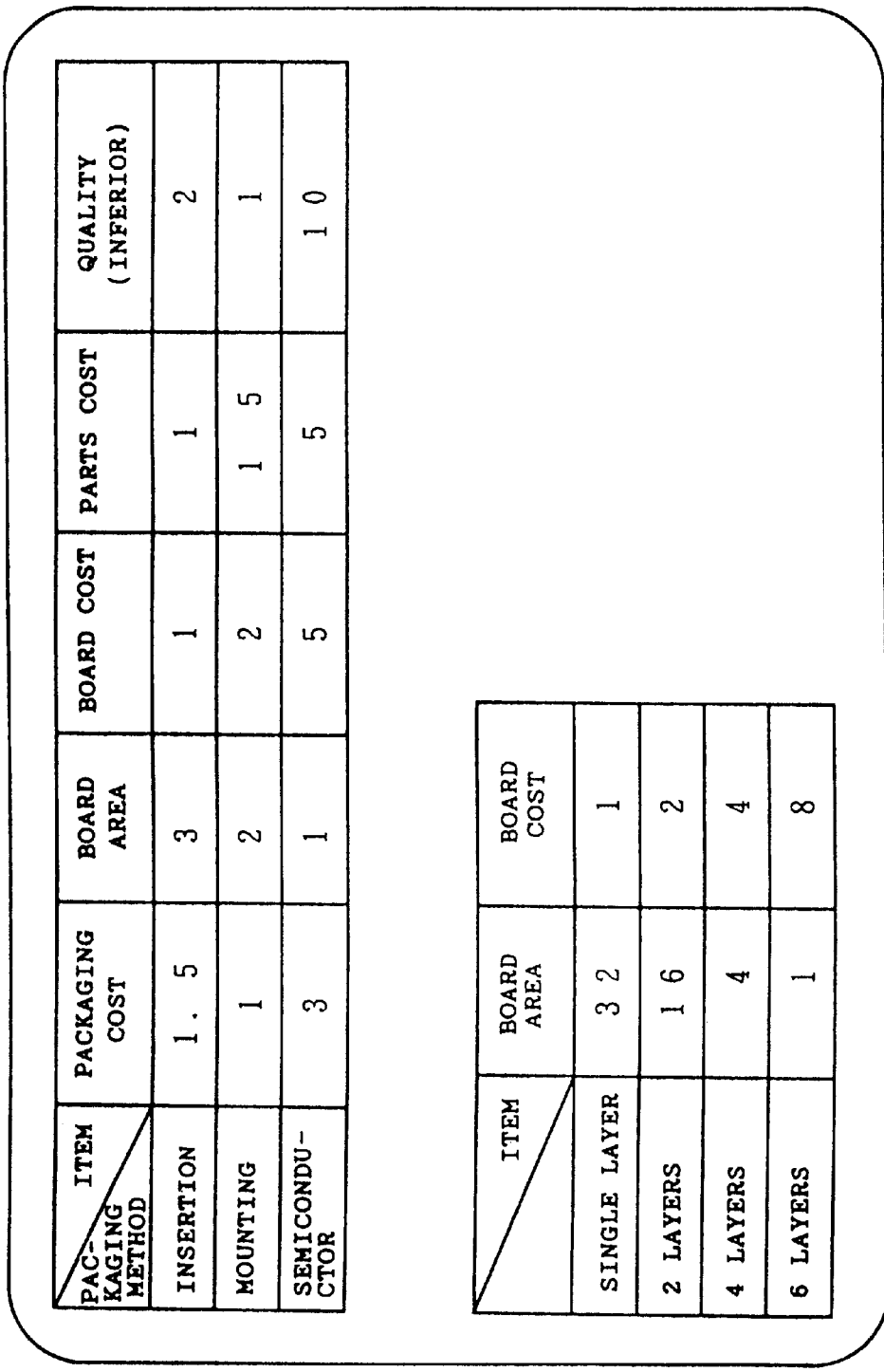
FIG. 9 is a view showing an example of a packaging method database in FIG. 1.
Figure 10:
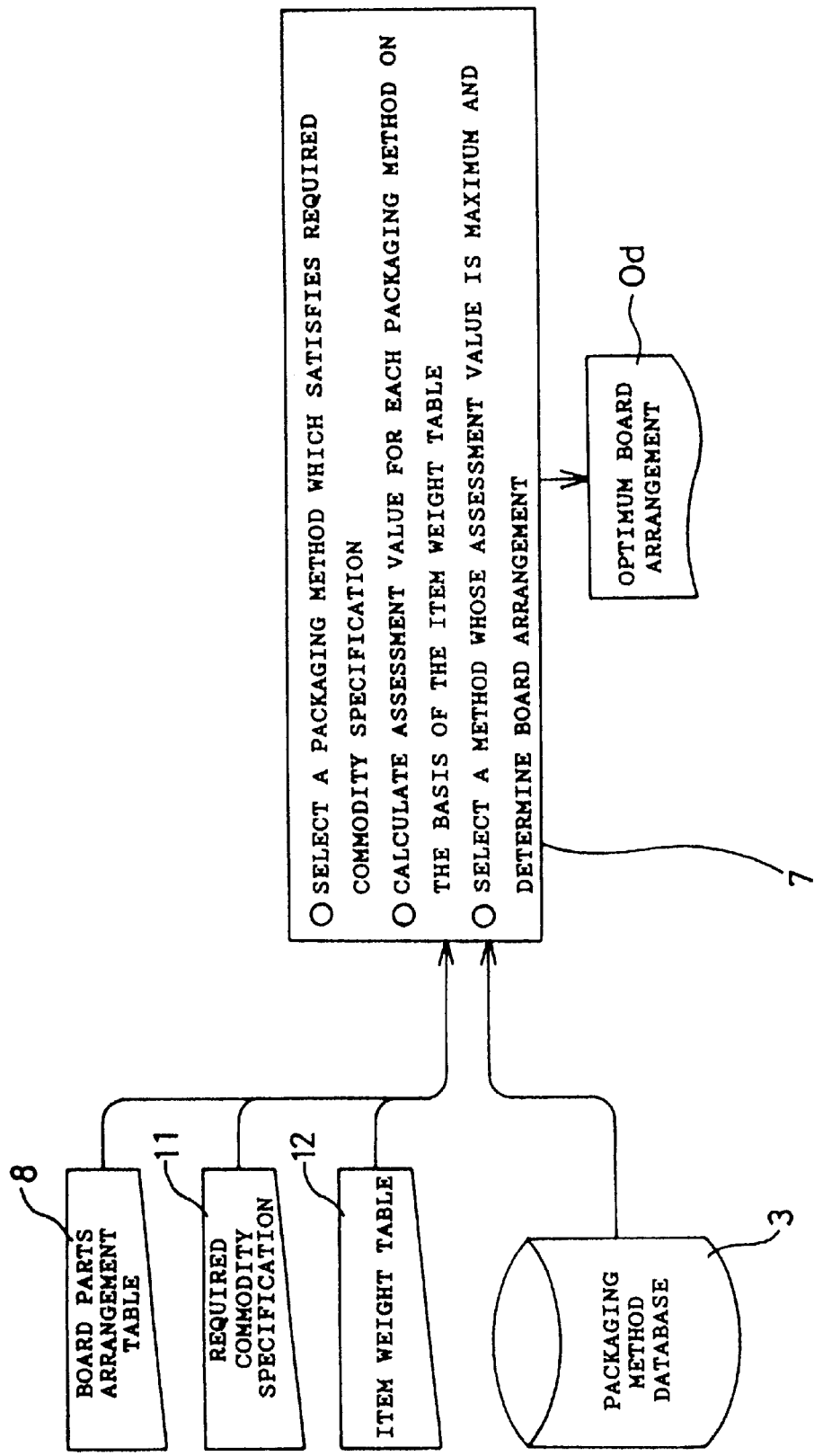
FIG. 10 is a view showing in detail a packaging board arrangement investigating algorithm.

Further, the computer A uses the packaging method database 3 exemplified in FIG. 9 and the packaging board arrangement investigating algorithm 7 shown in FIG. 10 so as to select the most rational packaging method which satisfies a required commodity specification, and makes an investigation to provide an optimum board so as to deliver data on the optimum board arrangement Od. Particularly, the packaging method database 3 stores assessment values of items to be investigated in connection with production, such as parts cost, packaging cost, control cost and quality, for each packaging method. The packaging board arrangement investigating algorithm 7 selects a packaging method which satisfies the required commodity specification, on the basis of the packaging method database 3, board parts arrangement table 8, required commodity specification 11, and item weight table 12, calculates the assessment value of each packaging method on the basis of the item weight table 12, selects a method whose assessment value is the greatest and determines the arrangement for packaging on boards.

Figure 11:
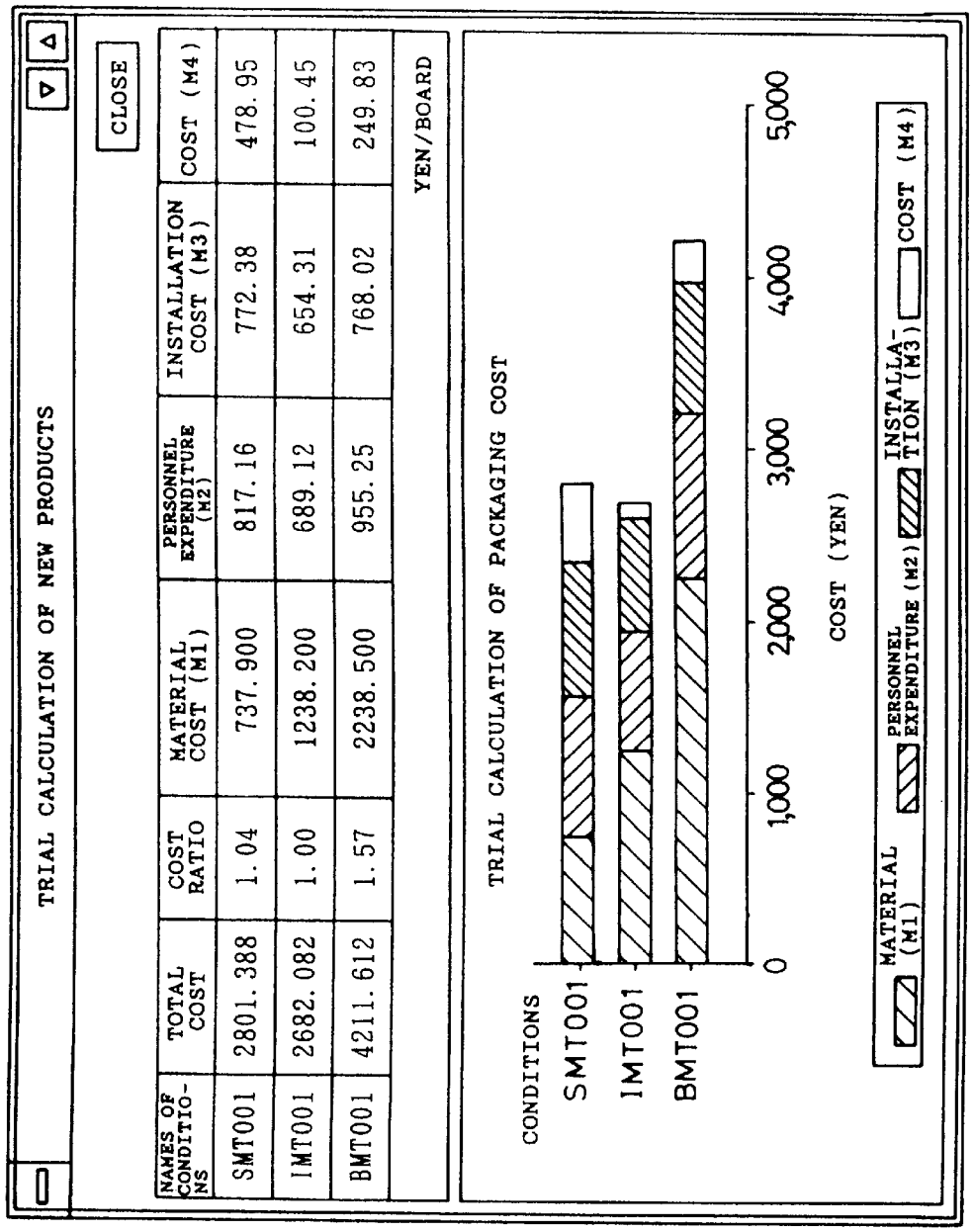
FIG. 11 is a view showing an example of a display screen depicting the result of a trial calculation of a packaging cost.
Figure 12:
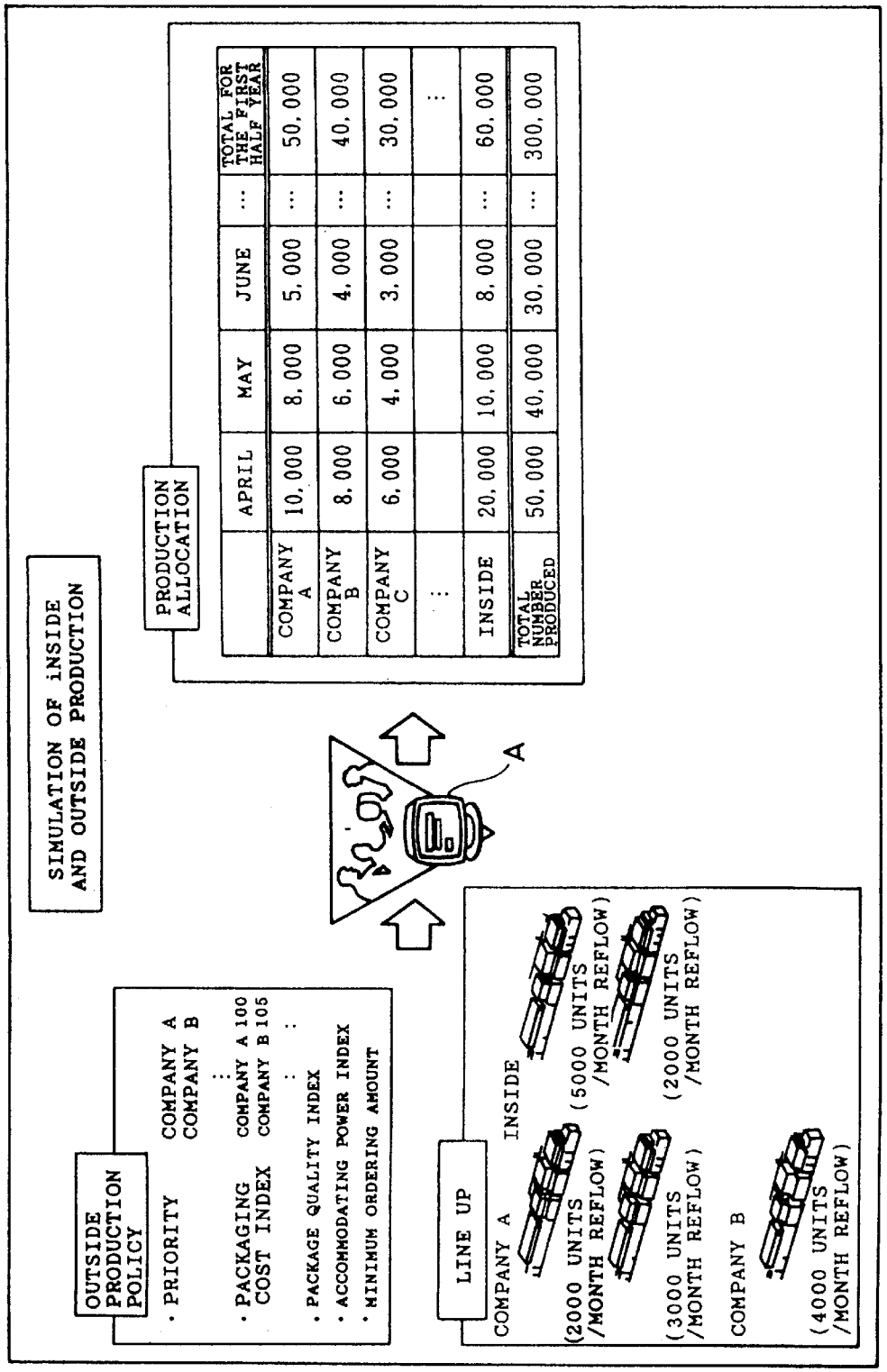
FIG. 12 is a conceptual presentation of a simulation of allocations of production to one's own company and others.
Figure 13:
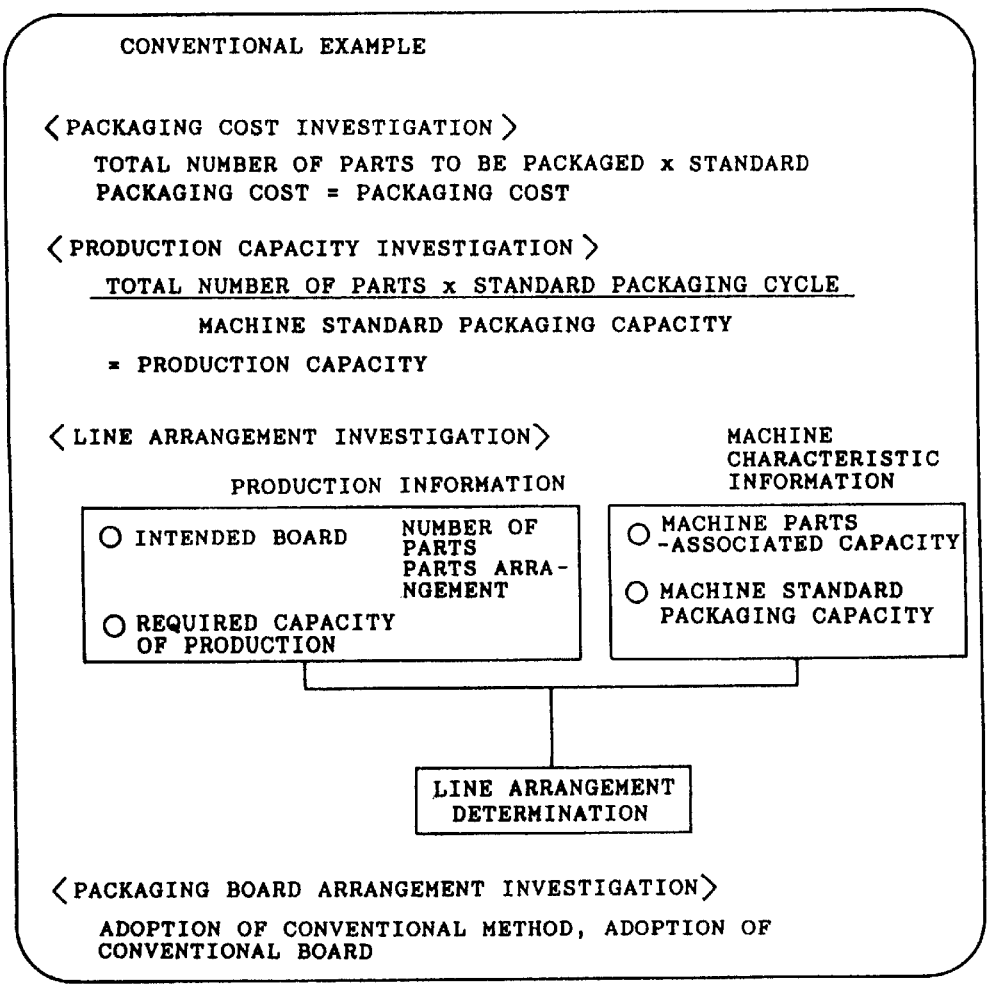
FIG. 13 is a view explaining how to make a management decision for a conventional packaging plant.

FIG. 11 shows an example of a display screen in the case where a trial calculation of packaging costs is made concerning the surface packaging machine, insertion packaging machine and semiconductor packaging machine. FIG. 12 shows by way of example a concept presentation of an inside and outside production simulation to determine the amount to be produced inside and the amount to be produced with an order placed outside.

In the embodiment described above, the packaging plant management assisting system comprises a packaging cost database 1, a packaging cost investigation algorithm 4, a machine characteristic database 2, a production capacity investigating algorithm 5, a line arrangement investigating algorithm 6, a packaging method database 3, and a packaging board arrangement investigating algorithm 7; thus, as described above, it is possible to make an investigation to provide an accurate overall packaging cost, accurate production capacity, an optimum line arrangement, and an optimum board arrangement. Even if the packaging plant management assisting system of the invention does not meet all of these structural requirements, however, a rapid investigation can be made to provide a more accurate efficient production plan than in the prior art through a combination of a single database and a single investigating algorithm, such as a combination of the packaging cost database and the packaging cost investigating algorithm, a combination of the machine characteristic database and the production capacity investigating algorithm, a combination of machine characteristic database and the line arrangement investigating algorithm, or a combination of the packaging method database and the packaging board arrangement investigating algorithm, or through a combination of a plurality of databases and a plurality of investigating algorithms.

What is claimed is:

1. A method for monitoring and controlling a packaging plant comprising:

storing in a database packaging cost data for individual types of parts to be packaged on a board;

applying an algorithm based on said packaging cost database so that packaging costs are minimized, wherein said algorithm considers at least the basis of the arrangement and number of parts on a board, and;

outputs a result produced by said algorithm wherein user selects an arrangement and number of parts based on said results.

2. A method for monitoring and controlling a packaging plant comprising:

generating a machine characteristic database wherein said database comprises machine characteristic information about parts-associated capacity and standard packaging capacity of a plurality of packaging machines;

applying an algorithm based on said machine characteristic database wherein said algorithm calculates the production capacity of each packaging machine by multiplying a packaging cycle for each type of parts by the sum of parts to be packaged, and dividing the multiplication product by an appropriate machine packaging capacity wherein the packaging cycle, the sum of the parts to be packaged and the machine packaging capacity are derived from said machine characteristic database, and;

outputting a result produced by said algorithm wherein user selects a machine for packaging parts based upon said results.

3. A method for monitoring and controlling a packaging plant comprising:

creating a machine characteristic database wherein said database comprises machine characteristic information about the parts-associated capacity and standard packaging capacity of a plurality of packaging machines;

applying an algorithm for selecting an optimum line arrangement by selecting an optimum machine based on production information about an arrangement and a number of parts and production capacity of boards to be produced wherein said production information is derived from said machine characteristic database, and;

a result from said algorithm is output wherein user selects an optimal line arrangement according to said results.

4. A method for monitoring and controlling a packaging plant comprising:

creating a packaging method database wherein said database comprises assessment values including parts costs, packaging costs, control costs and quality during the production with respect to each method utilized in said plant;

applying an algorithm to provide a method which satisfies a required commodity specification and which maximizes a calculated assessment value, by calculating an overall assessment value involved in production of a commodity of required specification for each packaging method, and;

outputting a result generated from said algorithm wherein user selects a packaging method based on said results.

5. A method for monitoring and controlling a packaging plant, comprising a combination of any two or more of the methods described in claims 1 through 4.

6. A system for monitoring and controlling a packaging plant comprising:

a computer wherein a packaging cost database and a packaging cost algorithm are stored and manipulatable; and a display for displaying data stored in said packaging cost database and results generated by said packaging cost algorithm wherein a user selects an arrangement and number of parts based upon said results.

7. A system for monitoring and controlling a packaging plant comprising:

a computer wherein a machine characteristic database and a production capacity algorithm are stored and manipulatable; and a display for displaying data stored in said machine characteristic database and results generated by said production capacity algorithm wherein a user selects a machine for packaging parts based upon said results.

8. A system for monitoring and controlling a packaging plant comprising:

a computer wherein a machine characteristic database and a line arrangement algorithm are stored and manipulatable; and a display for displaying data stored in said machine characteristic database and results generated by said line arrangement algorithm are displayed wherein a user selects an optimal line arrangement according to said results.

9. A system for monitoring and controlling a packaging plant comprising:

a computer wherein a packaging method database and packaging board arrangement algorithm are stored and manipulatable; and a display for displaying data stored in said machine characteristic database and results generated by packaging board arrangement algorithm are displayed wherein a user selects a packaging method based upon said results.

10. A system for monitoring and controlling a packaging plant, comprising a combination of any two or more of the systems described in claims 6 through 9.

* * * * *